United States Patent
Colber, Jr. et al.

(10) Patent No.: US 10,774,879 B2
(45) Date of Patent: *Sep. 15, 2020

(54) SELF-ENGAGING CLUTCH

(71) Applicant: TTI (MACAO COMMERCIAL OFFSHORE) LIMITED, Macau (MO)

(72) Inventors: William E. Colber, Jr., Lavonia, GA (US); Michael Feng, Seneca, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 111 days.

This patent is subject to a terminal disclaimer.

(21) Appl. No.: 15/946,072

(22) Filed: Apr. 5, 2018

(65) Prior Publication Data
US 2018/0223913 A1 Aug. 9, 2018

Related U.S. Application Data

(63) Continuation of application No. 14/994,177, filed on Jan. 13, 2016, now Pat. No. 9,951,824.

(51) Int. Cl.
*F16D 11/14* (2006.01)
*F16D 41/22* (2006.01)
*F16D 11/00* (2006.01)

(52) U.S. Cl.
CPC ............. *F16D 11/14* (2013.01); *F16D 41/22* (2013.01); *F16D 2011/008* (2013.01)

(58) Field of Classification Search
CPC ..... F16D 11/14; F16D 2011/008; F16D 41/22
See application file for complete search history.

(56) References Cited

U.S. PATENT DOCUMENTS

| 2,226,896 A | 12/1940 | Cooper |
| 2,645,300 A | 7/1953 | Watts et al. |
| 2,815,633 A | 12/1957 | Meyer |
| 2,993,329 A | 7/1961 | Schmidt |
| 3,181,673 A * | 5/1965 | Poliseo ............... F16D 41/22 |
| | | 192/103 A |
| 3,247,654 A | 4/1966 | Nemeth et al. |
| 3,411,275 A | 11/1968 | Mattson et al. |

(Continued)

FOREIGN PATENT DOCUMENTS

EP 2594412 B1 1/2014

OTHER PUBLICATIONS

European Search Report for Application 16206481.0 dated Jul. 4, 2017 (8 pages).

*Primary Examiner* — Huan Le
(74) *Attorney, Agent, or Firm* — Michael Best & Friedrich LLP

(57) ABSTRACT

A clutch assembly for selectively rotationally coupling a prime mover to an output comprises an input member including an input clutch protrusion, an output member including an output clutch protrusion, and an intermediate member positioned between the input member and the output member. The intermediate member includes a first clutch member engaged with the input clutch protrusion and a second clutch member axially spaced from, but engagable with, the output clutch protrusion. The intermediate member is axially displaceable toward the output member to engage the second clutch member with the output clutch protrusion in response to rotation of the input member relative to the intermediate member.

18 Claims, 5 Drawing Sheets

(56) References Cited

U.S. PATENT DOCUMENTS

| | | |
|---|---|---|
| 3,493,088 A | 2/1970 | Hoff |
| 3,743,067 A | 7/1973 | Bokovoy |
| 4,466,233 A | 5/1984 | Thesman |
| 4,493,180 A | 1/1985 | Wick |
| 4,573,307 A | 3/1986 | Wick |
| 5,339,145 A | 8/1994 | Omura |
| 5,718,105 A | 2/1998 | Irikura et al. |
| 6,346,060 B1 | 2/2002 | Shimizu et al. |
| 6,475,109 B2 | 11/2002 | Blanchard |
| 6,874,305 B2 * | 4/2005 | Ishimori ............... A01D 34/64 |
| | | 180/6.2 |
| 7,175,012 B2 | 2/2007 | Ruebusch et al. |
| 7,661,254 B2 | 2/2010 | Ishimori |
| 9,951,824 B2 * | 4/2018 | Colber, Jr. ............ F16D 11/14 |
| 2008/0182693 A1 | 7/2008 | Holmes |
| 2009/0277744 A1 | 11/2009 | Shinagawa et al. |
| 2013/0046448 A1 | 2/2013 | Fan et al. |
| 2016/0052337 A1 | 2/2016 | Tien |

* cited by examiner

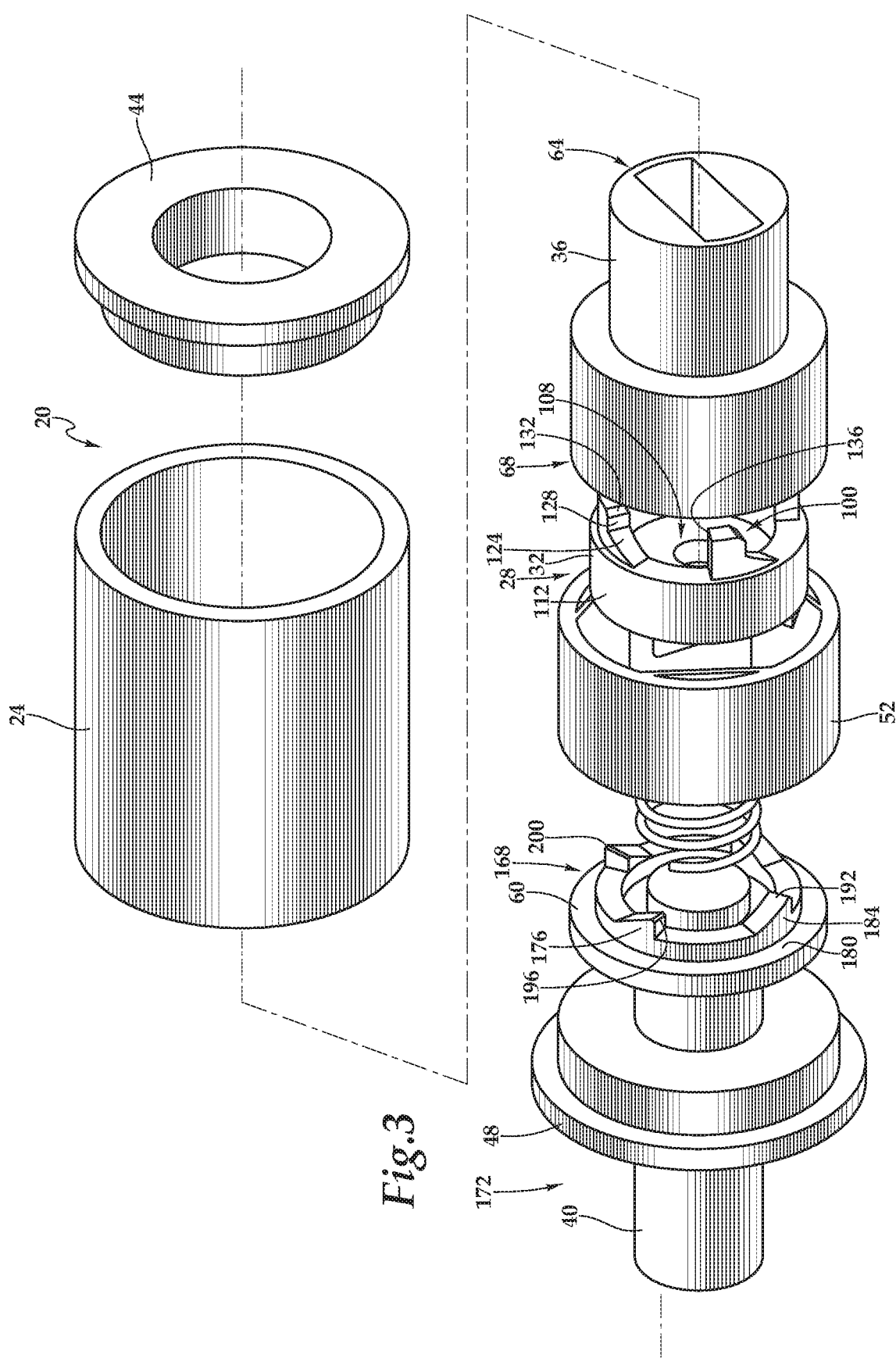

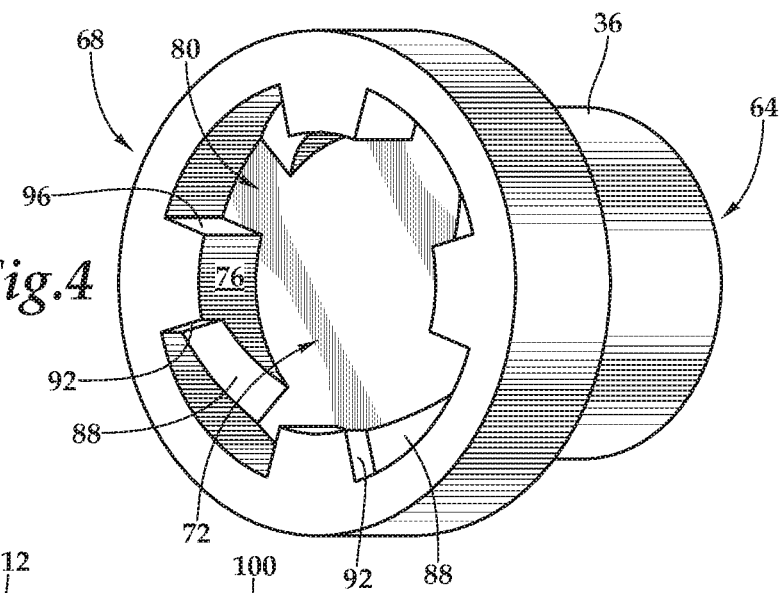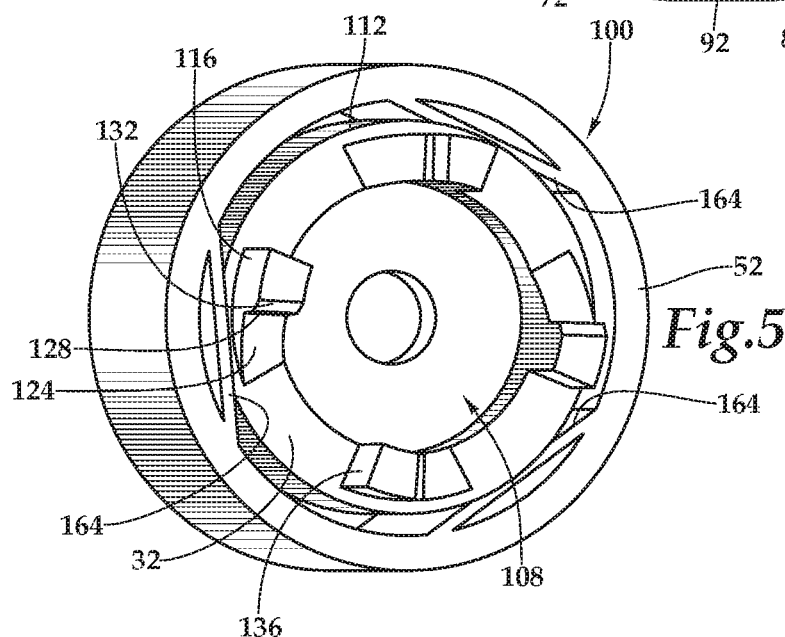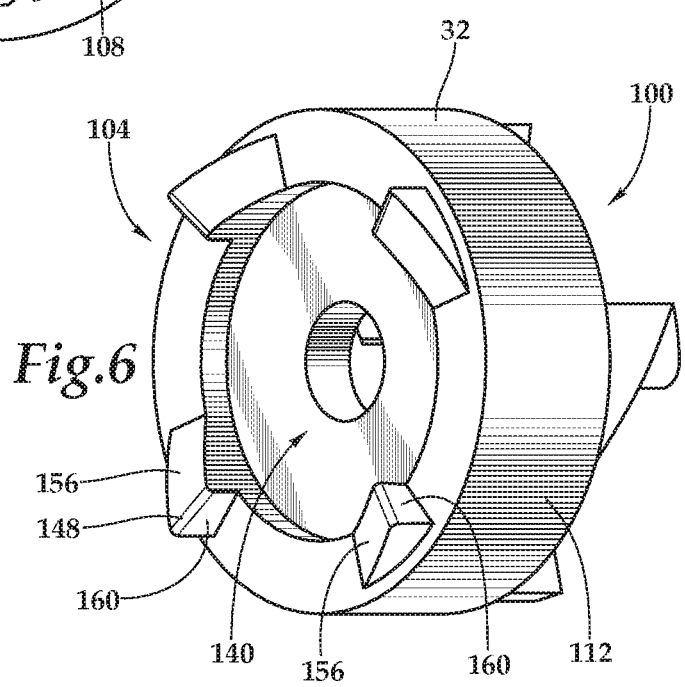

SELF-ENGAGING CLUTCH

CROSS-REFERENCE TO RELATED APPLICATIONS

This application is a continuation of U.S. patent application Ser. No. 14/994,177 filed on Jan. 13, 2016, now U.S. Pat. No. 9,951,824, the entire content of which is incorporated herein by reference.

FIELD OF THE INVENTION

The present invention relates to a clutch assembly, and more particularly to a self-engaging clutch assembly.

SUMMARY OF THE INVENTION

The present invention provides, in one aspect, a clutch assembly for selectively rotationally coupling a prime mover to an output. The clutch assembly comprises an input member including an input clutch protrusion, an output member including an output clutch protrusion, and an intermediate member positioned between the input member and the output member. The intermediate member includes a first clutch member engaged with the input clutch protrusion and a second clutch member axially spaced from, but engageable with, the output clutch protrusion. The intermediate member is axially displaceable toward the output member to engage the second clutch member with the output clutch protrusion in response to rotation of the input member relative to the intermediate member.

The present invention provides, in another aspect, a method of operating a clutch assembly. The method comprises spacing the intermediate member away from the output member when the input member is at rest, rotating the input member relative to the intermediate member to induce axial displacement of the intermediate member toward the output member, and engaging the intermediate member with the output member, at a time after the rotating of the input member, such that the input member, the intermediate member, and output member become co-rotational.

Other features and aspects of the invention will become apparent by consideration of the following detailed description and accompanying drawings.

BRIEF DESCRIPTION OF THE DRAWINGS

FIG. 3 is an exploded view of the clutch assembly.

FIG. 4 is a perspective view of an input member of the clutch assembly.

FIG. 5 is a perspective view of a friction ring and an intermediate member of the clutch assembly.

FIG. 6 is a perspective view of a second side of the intermediate member illustrated in FIG. 5.

Figure 1:
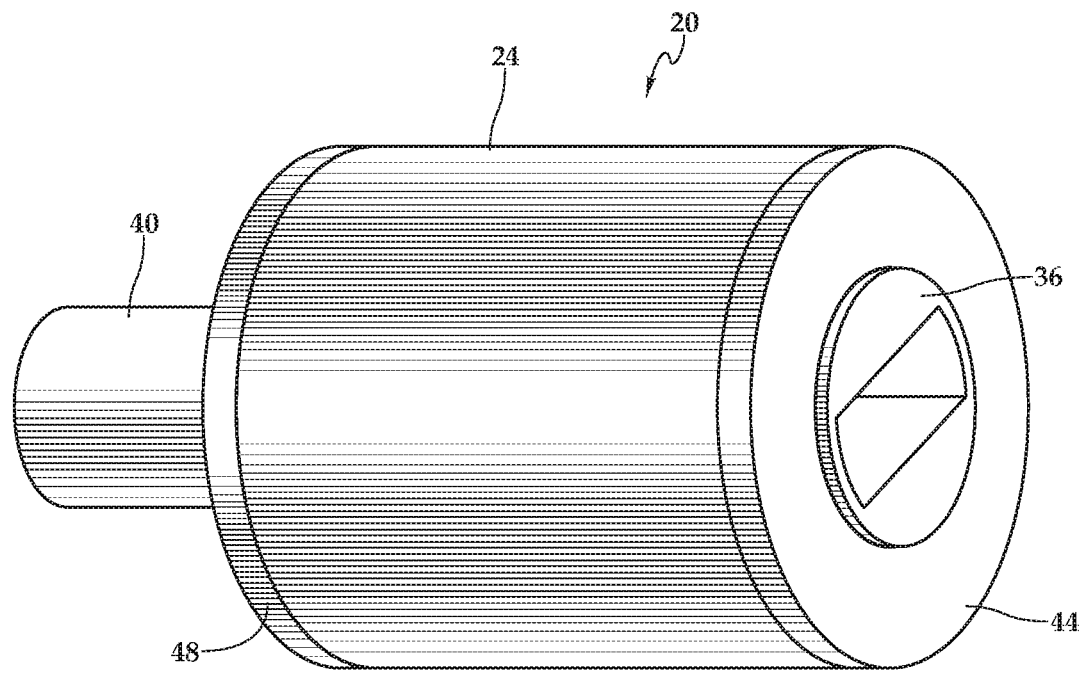
FIG. 1 is a perspective view of a clutch assembly.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-7 illustrate a self-engaging clutch 20 that may be used in, for example, a self-propelled lawn mower. The self-engaging clutch 20 includes a housing 24 supporting a clutch assembly 28 having an intermediate member 32 that is movably disposed between an input member 36 and an output member 40. As described in greater detail below, the clutch assembly 28 is operationally configured to move from a disengaged, resting configuration to an engaged configuration when the input member 36 is rotated by a prime mover (e.g., an internal combustion engine, an electric motor, etc.).

Figure 2:
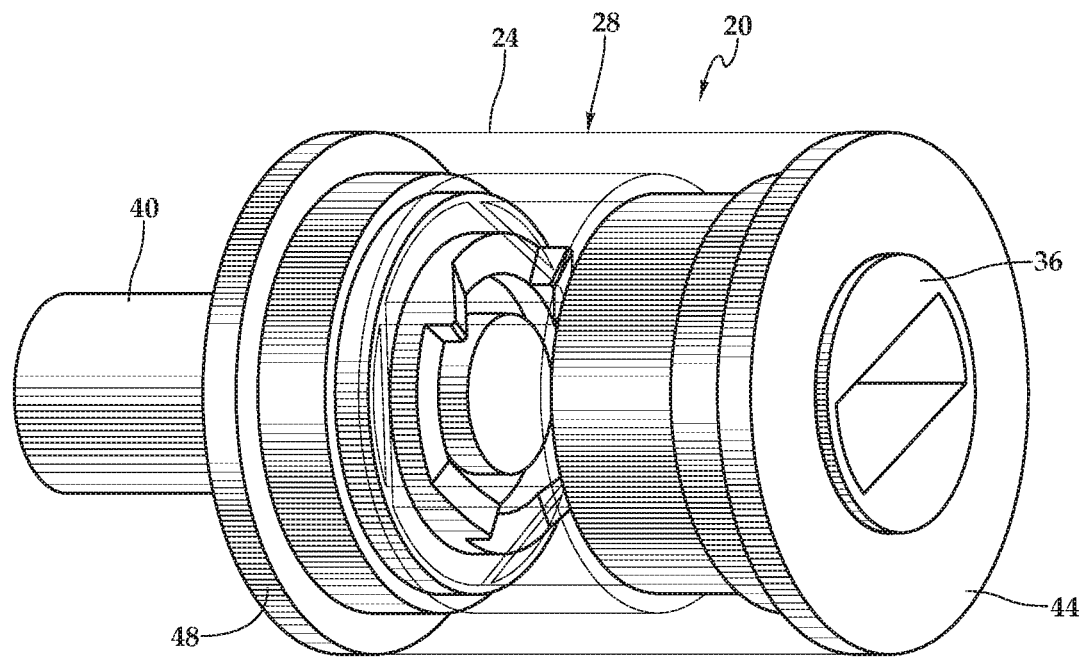
FIG. 2 is a perspective view of the clutch assembly of FIG. 1 with portions of the assembly removed to illustrate internal components of the clutch assembly.

FIGS. 1-3 illustrate the self-engaging clutch 20 that includes the generally cylindrical housing 24 at least partially supporting the clutch assembly 28. The input member 36 and the output member 40 extend out from opposite sides of the housing 24 through an input bearing 44 and an output bearing 48, respectively, that are each coupled to the housing 24 to rotatably support the input member 36 or output member 40 (FIG. 3). The portion of the input member 36 that extends out of the housing 24 may be operatively coupled, either directly or indirectly, to the prime mover. The portion of the output member 40 that extends out of the housing 24 may be operatively coupled to an output (e.g., a wheel, a blade, etc.).

With reference to FIG. 3, the clutch assembly 28 further includes a friction ring 52 disposed concentrically about the intermediate member 32. As described in greater detail below, the friction ring 52 frictionally engages the intermediate member 32 in order to provide resistance to the rotation of the intermediate member 32. Also shown in FIG. 3 is a biasing member 56 (e.g., coil spring, leaf spring, etc.) that abuts the output member 40 and the intermediate member 32 so as to bias the intermediate member 32 away from the output member 40. In the illustrated embodiment, the output member 40 includes an output clutch 60 that is coupled to the output member 40 (e.g., interference fit, threaded connection, etc.). In other embodiments, the output clutch 60 may be integrally formed as one piece with the output member 40.

With reference to FIG. 4, the input member 36 includes a first side 64 engageable with the prime mover and a second side 68 engageable with the intermediate member 32. The second side 68 includes a generally cylindrical bore 72 having a plurality of clutch protrusions 76 that are circumferentially spaced along an inner periphery of the bore 72 such that gaps 80 are defined between adjacent clutch protrusions 76. Each clutch protrusion 76 extends radially inwardly from the inner periphery of the bore 72 and includes a ramped cam surface 88, an end wall 92, and a flat face 96. The ramped cam surfaces 88 are angled to extend axially away from a bottom surface of the bore 72 and circumferentially along the inner periphery. Each cam surface 88 is contiguous with and terminates at the end wall 92, which extends approximately perpendicular to and away from a bottom surface of the bore 72 to define a surface that is engageable with the intermediate member 32. The second face 96 is approximately parallel to the end wall 92, and extends from the bottom surface to an outer extent of the bore 72.

With reference to FIGS. 5 and 6, the intermediate member 32 includes a first side 100 that is engageable with the input member 36 (FIG. 5) and a second side 104 that is engageable with the output member 40 (FIG. 6). The first side 100 includes a first bore 108 defining a recess bounded by an arcuate sidewall 112. The sidewall 112 includes a first plurality of clutch members 116 that are circumferentially spaced along the sidewall 112 in facing arrangement with the input member 36. Each clutch member 116 includes a ramped surface 124 contiguous with an end wall 128 having a chamfered edge 132, and a flat face 136 that extends substantially perpendicular to a top surface of the sidewall 112.

With reference to FIG. 6, the second side 104 includes a second bore 140 defining a recess bounded by a sidewall 112. The sidewall 112 includes a second plurality of clutch members 148 that are circumferentially spaced along the sidewall 112 in facing arrangement with the output member 40. Each clutch member 148 includes a ramped cam surface 156 and a flat face 160 that is substantially perpendicular to a top surface of the sidewall 112.

Referring back to FIG. 5, the friction ring 52 includes friction surfaces 164 disposed on an interior surface of the ring 52. The friction surfaces 164 are flat surfaces 164 forming chords extending across the cylindrical interior surface. The friction surfaces 164 act upon the intermediate member 32 in order to provide resistance to relative rotation of the intermediate member 32, thereby facilitating relative rotation between the intermediate member 32 and the input member 36.

Figure 7:
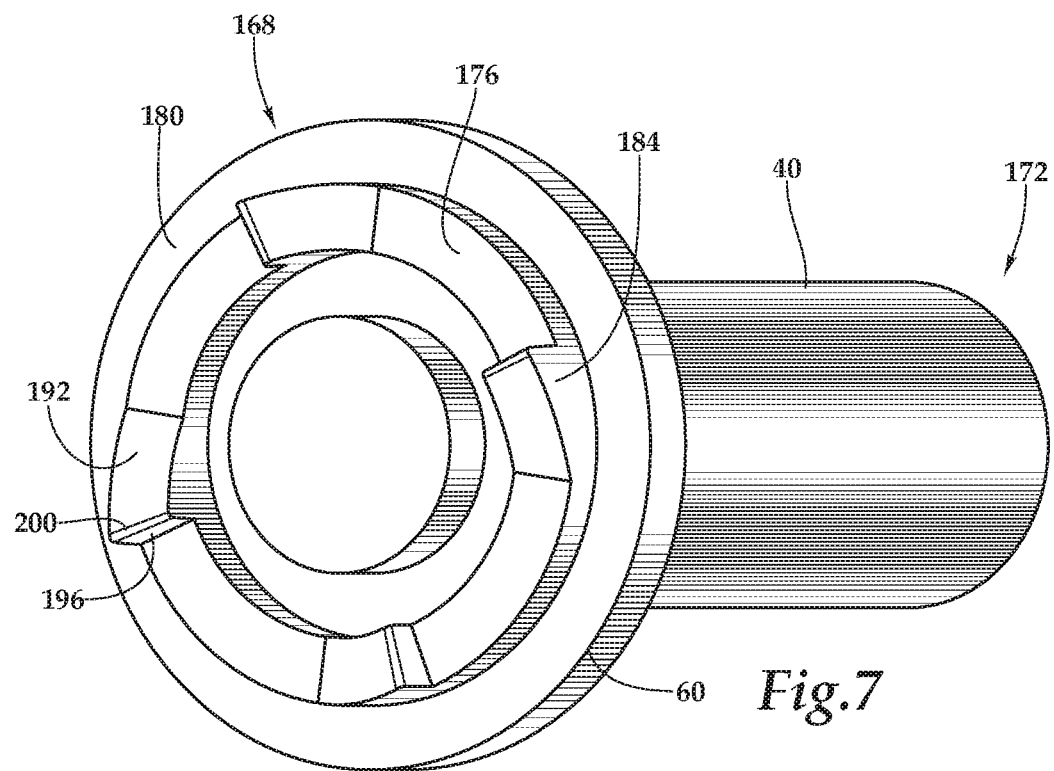
FIG. 7 is a perspective view of the output member of the clutch assembly.

Referring to FIG. 7, the output member 40 includes a first side 168 supporting the output clutch 60 that is engageable with the second side 104 of the intermediate member 32, and a second side 172 that is operatively coupled to the output. The output clutch 60 is a disc-shaped member that includes a raised circular clutch surface 176 extending toward the intermediate member 32 from an interior portion of the output clutch 60 such that an edge 180 is defined concentrically about the clutch surface 176. The clutch surface 176 includes a plurality of clutch projections 184 that extend away from the clutch surface 176. The clutch projections 184 each include a ramped cam surface 192 and a flat face 196 having a chamfered upper edge 200. The ramped cam surface 192 terminates at the chamfered upper edge 200 so as to be generally contiguous with the face 196. Each face 196 extends perpendicular to and away from the clutch surface 176 to define a surface that is engageable with the intermediate member 32.

Figure 8:
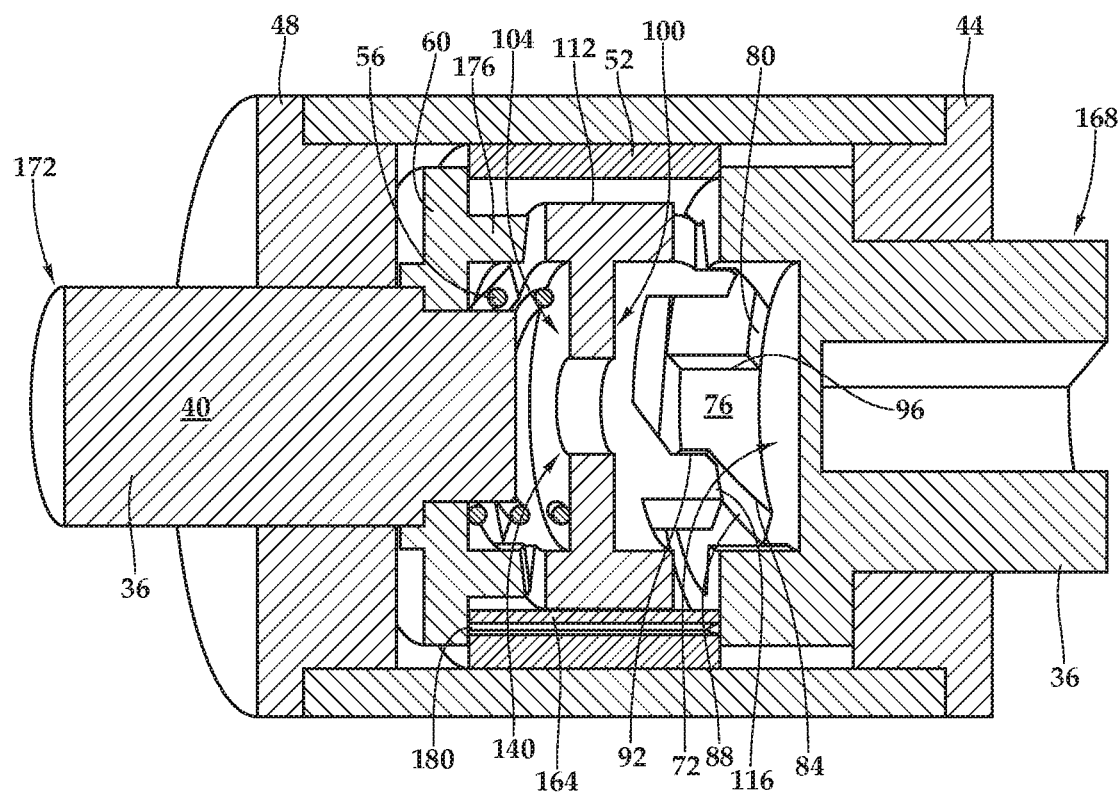
FIG. 8 is a cross section of the clutch assembly.

To assemble the self-engaging clutch 20, the output member 40, with output clutch 60 attached thereto, is inserted into the housing 24 and engaged by the output bearing 48 so as to rotatably support the output member 40 within the housing 24. The biasing member 56 is then inserted into the opposite end and is placed into abutting engagement with the output member 40. Subsequently, the friction ring 52 is inserted to engage the edge 180 of the output clutch 60 with the biasing member 56 extending through the interior of the friction ring 52 (FIG. 4). The intermediate member 32 is then placed into the housing 24 within the friction ring 52 such that the biasing member 56 is received within the second bore. The intermediate member 32 is therefore biased away and disengaged from the output member 40. The input member 36 is inserted such that the first side 100 of the intermediate member 32 engages the second side 68 of the input member 36. The friction ring 52 is also engaged by the outer extent of the bore 72, allowing the friction ring 52 to be supported between the input member 36 and the output member 40 (FIG. 8). Finally, the input bearing 44 is attached to close and seal the housing 24 such that the input member 36 is rotatably supported within by the input bearing 44. However, it should be noted that the clutch may be assembled in other ways (e.g., starting with the input member 36, etc.).

Figure 9:
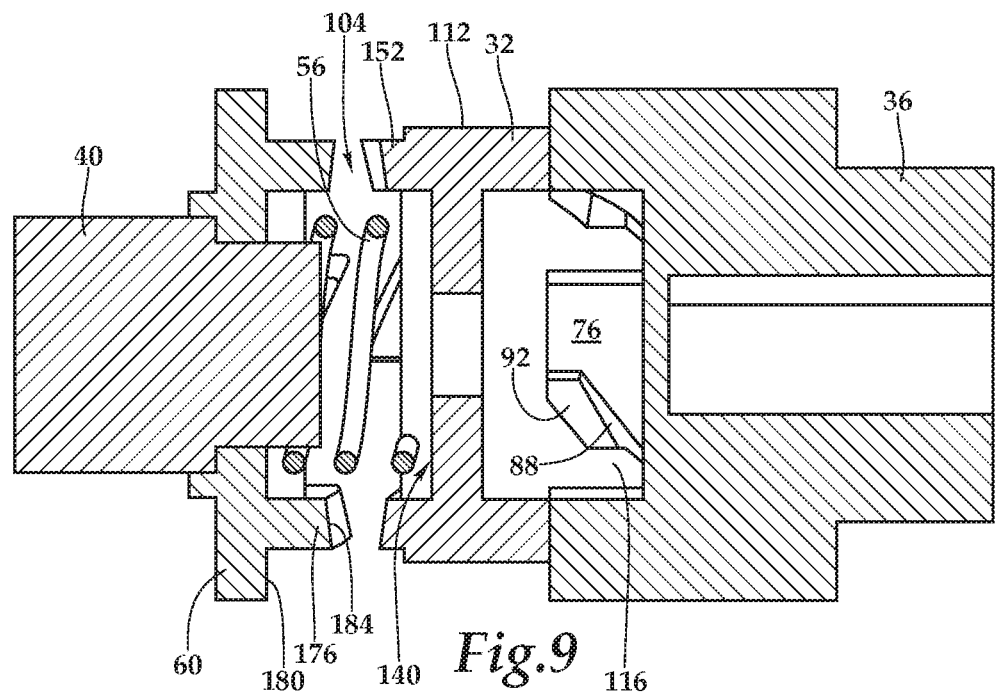
FIG. 9 is a cross section of a portion of the clutch assembly in a disengaged configuration.

With reference to FIG. 9, the clutch assembly 28 is configured to remain in the disengaged configuration when the input member 36 is at rest (i.e., not being driven by the prime mover) and the output member 40 is freely rotatable. In this configuration, the intermediate member 32 is axially spaced from the output member 40 by the biasing force of the biasing member 56, and the first clutch members 116 of the intermediate member 32 are received in the gaps 80 between the clutch protrusions 76 of the input member 36.

Figure 10:
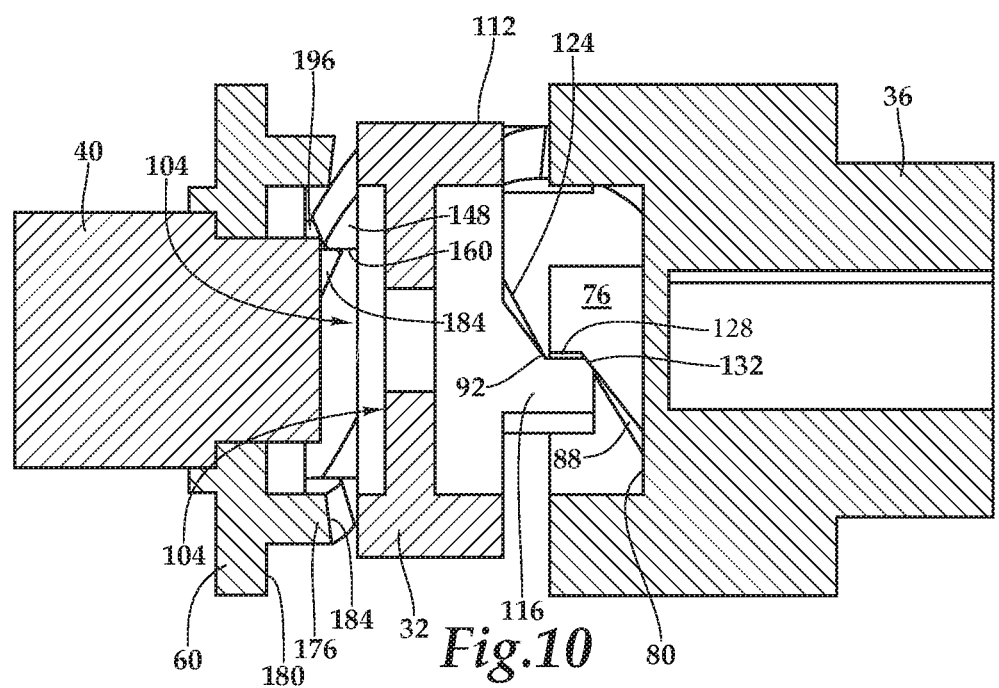
FIG. 10 is a cross section of the portion of the clutch assembly illustrated in FIG. 6 in an engaged configuration.

With reference to FIG. 10, the clutch assembly 28 moves into the engaged configuration shortly after the input member 36 is driven to rotate in the proper direction. In the engaged configuration, the intermediate member 32 is axially displaced against the bias of the biasing member 56 via interaction with the input member 36 such that the intermediate member 32 engages the output member 40. In particular, the first clutch members 116 of the first side 100 of the intermediate member 32 engage the clutch protrusions 76 of the input member 36—that is, the end walls 128 of each of the first clutch members 116 and the end walls 92 of the clutch protrusions 76 are in contact in order to transmit force therebetween. In addition, the second clutch members 148 of the second side 104 of the intermediate member 32 engage the clutch projections 184 of the output member 40—that is, the face 160 of the second clutch members 148 and the face 196 of the clutch projections 184 are in contact in order to transmit force therebetween. In this way, torque is transmitted from the input member 36 to the output member 40 via the intermediate member 32 to co-rotate the input and output member 40.

In operation, the clutch assembly 28 is maintained in the disengaged configuration until torque is applied by the prime mover. When torque is delivered to the input member 36, the process to move the clutch from the disengaged configuration to the engaged configuration begins. First, the input member 36 begins to rotate while the intermediate member 32 is generally prevented from rotating with the input member 36 via the frictional engagement with the friction ring 52. Relative rotation between the input member 36 and the intermediate member 32 causes the chamfered edge 132 of the first clutch members 116 to slide into engagement with the cam surfaces 88. Further rotation of the input member 36 relative to the intermediate member 32 causes the first clutch members 116, via engagement on the chamfered edge 132, to cam along the cam surface 88 thereby axially displacing the intermediate member 32 against the bias of the biasing member 56 until the end walls 128 of the first clutch members 116 engage the end walls 92 of the clutch protrusions 76 to render the intermediate member 32 and input member 36 co-rotational. Concurrently, the axial displacement and rotation of the intermediate member 32 causes the second side 104 of the intermediate member 32 to engage the output member 40—that is, the flat face 160 of the clutch members 148 engage the flat face 196 of the clutch projections 184. This engagement results in the engaged configuration of the clutch assembly 28, wherein the input member 36 and the output member 40 are co-rotational and torque is transmitted from the prime mover to the output.

One exemplary advantage of the clutch assembly 28 described above lies in the fact that the clutch assembly 28 engages upon torque being applied to the input member 36 without the need for user input or direct actuation of the clutch assembly (e.g., operating a lever or other actuation mechanism) to actuate movement of the clutch assembly 28 from the disengaged configuration to the engaged configuration. This means that when power is not being applied by the prime mover, the clutch remains disengaged and the output is allowed to rotate freely.

Various features of the invention are set forth in the following claims.

What is claimed is:

1. A clutch assembly for selectively rotationally coupling a prime mover to an output, the clutch assembly comprising:
    an input member including an input clutch protrusion;
    an output member including an output clutch protrusion;
    an intermediate member positioned between the input member and the output member, the intermediate member including a first clutch member engaged with the input clutch protrusion and a second clutch member axially spaced from, but engagable with, the output clutch protrusion; and
    a friction ring disposed concentrically about the intermediate member and engaging the intermediate member to resist rotation of the intermediate member relative to the output member;
    wherein the intermediate member is axially displaceable toward the output member to engage the second clutch member with the output clutch protrusion in response to rotation of the input member relative to the intermediate member; and
    wherein, subsequent to engagement of the second clutch member and the output clutch protrusion, the friction ring allows the intermediate member to rotate with the input member and the output member.

2. The clutch assembly of claim 1, wherein the input clutch protrusion includes a ramped surface and an end wall.

3. The clutch assembly of claim 2, wherein the first clutch member includes a flat face engagable with the end wall.

4. The clutch assembly of claim 3, wherein rotation of the input member causes the first clutch member to cam along the ramped surface to axially displace the intermediate member until the flat face engages the end wall.

5. The clutch assembly of claim 1, wherein the intermediate member is in a disengaged configuration when the input member is stationary, and the intermediate member is in an engaged configuration after the input member begins to rotate.

6. The clutch assembly of claim 1, wherein the input member includes a first clutching arrangement, of which the input clutch protrusion is a portion, that faces the first clutch member, and wherein the output member includes a second clutching arrangement, of which the output clutch protrusion is a portion, that faces the second clutch member.

7. The clutch assembly of claim 6, further comprising a biasing member biasing the intermediate member axially away from the output member and toward a first position in which the second clutching arrangement and the second clutch member are adjacent one another.

8. The clutch assembly of claim 7 wherein rotation of the input member relative to the intermediate member in a first direction moves the intermediate member toward a second position in which the second clutching arrangement and the second clutch member are engaged to produce co-rotation of the input member and the intermediate member.

9. The clutch assembly of claim 8, wherein the intermediate member is moved from the first position to the second position when the input member is driven to rotate such that no direct operation of the clutch assembly by a user is required.

10. The clutch assembly of claim 8, wherein the first clutching arrangement and the first clutch member are engaged to produce co-rotation of the intermediate member and the input member.

11. The clutch assembly of claim 8, wherein the second clutching arrangement includes a first ramped cam surface and a first flat face.

12. The clutch assembly of claim 11, wherein the second clutch member includes a first ramped cam surface and a second flat face.

13. The clutch assembly of claim 12, wherein the first flat face and the second flat face are engaged in the second position of the intermediate member such that the intermediate member transmits torque to the output member to co-rotate the input member and the output member.

14. The clutch assembly of claim 1, wherein the clutch assembly is disposed within a lawn mower.

15. A method of operating a clutch assembly including an input member, an output member, and an intermediate member engaged with the input member and engageable with the output member, the method comprising:
    spacing the intermediate member away from the output member when the input member is at rest;
    resisting rotation of the intermediate member relative to the output member with a friction ring disposed concentrically about the intermediate member;
    rotating the input member relative to the intermediate member to induce axial displacement of the intermediate member toward the output member, thereby engaging the intermediate member and the output member; and
    subsequent to engagement of the intermediate member and the output member, allowing the the input member, the intermediate member, and the output member to co-rotate relative to the friction ring.

16. The method according to claim 15, wherein the input member includes a ramped clutch interface that engages a first side of the intermediate member.

17. The method according to claim 16, wherein rotating the input member causes the first side to slide along the ramped clutch interface, causing axial displacement of the intermediate member relative to the input member.

18. The method according to claim 15, wherein engaging the intermediate member with the output member requires no direct operation of the clutch assembly by a user.

* * * * *